(12) United States Patent
Sanders et al.

(10) Patent No.: US 6,829,859 B1
(45) Date of Patent: Dec. 14, 2004

(54) LANDSCAPE PRODUCT THAT BURNS CITRONELLA

(76) Inventors: Debra H. Sanders, 13662 Blanton Rd., Ashland, VA (US) 23005; William D. Sanders, 13662 Blanton Rd., Ashland, VA (US) 23005

( * ) Notice: Subject to any disclaimer, the term of this patent is extended or adjusted under 35 U.S.C. 154(b) by 0 days.

(21) Appl. No.: 10/465,566

(22) Filed: Jun. 20, 2003

(51) Int. Cl.[7] .............................. A01G 1/04; A61L 9/00
(52) U.S. Cl. ...................................... 47/1.01 R; 422/4
(58) Field of Search ................................ 431/278, 279, 431/298, 328, 331, 344, 356

(56) References Cited

U.S. PATENT DOCUMENTS

| | | | | |
|---|---|---|---|---|
| 2,019,382 | A | * 10/1935 | Aronson | 431/127 |
| 2,811,031 | A | * 10/1957 | Russ, Jr. | 431/310 |
| 3,983,677 | A | * 10/1976 | Lundbom | 53/415 |
| 4,557,687 | A | * 12/1985 | Schirneker | 431/291 |
| 5,395,244 | A | * 3/1995 | O'Neill | 434/151 |
| 5,765,751 | A | 6/1998 | Joshi | |
| 5,840,246 | A | * 11/1998 | Hammons et al. | 422/4 |
| 5,938,430 | A | * 8/1999 | Majerowski | 431/320 |
| 6,159,002 | A | * 12/2000 | LeJeune | 431/324 |
| 6,250,912 | B1 | * 6/2001 | Widdowson | 431/324 |
| 6,579,090 | B1 | * 6/2003 | Taubitz et al. | 431/320 |

OTHER PUBLICATIONS

Pub. No.: US 2001/0036609 A1□□Candle Fountain by Ehrlich et al.; Nov. 1, 2001.*
U.S. Pub. No. US 2001/0008318 A1, published Jul. 19, 2001 to J. Mosbaugh.

* cited by examiner

*Primary Examiner*—Michael J. Carone
*Assistant Examiner*—Francis T. Palo
(74) *Attorney, Agent, or Firm*—Richard C. Litman

(57) ABSTRACT

The invention is directed to a landscape product that burns a fuel containing citronella to deter insects and which does not look like a conventional anti-insect device in a landscaped environment. The landscape product comprises a container defining an aperture, a stone having a through bore and located above the fuel container, a wick holder located above the aperture and extending through the through-bore to a position above at least part of the stone, and a wick extending upwardly from within the fuel container and through the wick holder to a location above the wick holder and thence to a position above at least part of the stone. The landscape product is capable of burning a liquid fuel containing citronella oil to provide a landscape product to deter undesirable insects.

8 Claims, 5 Drawing Sheets

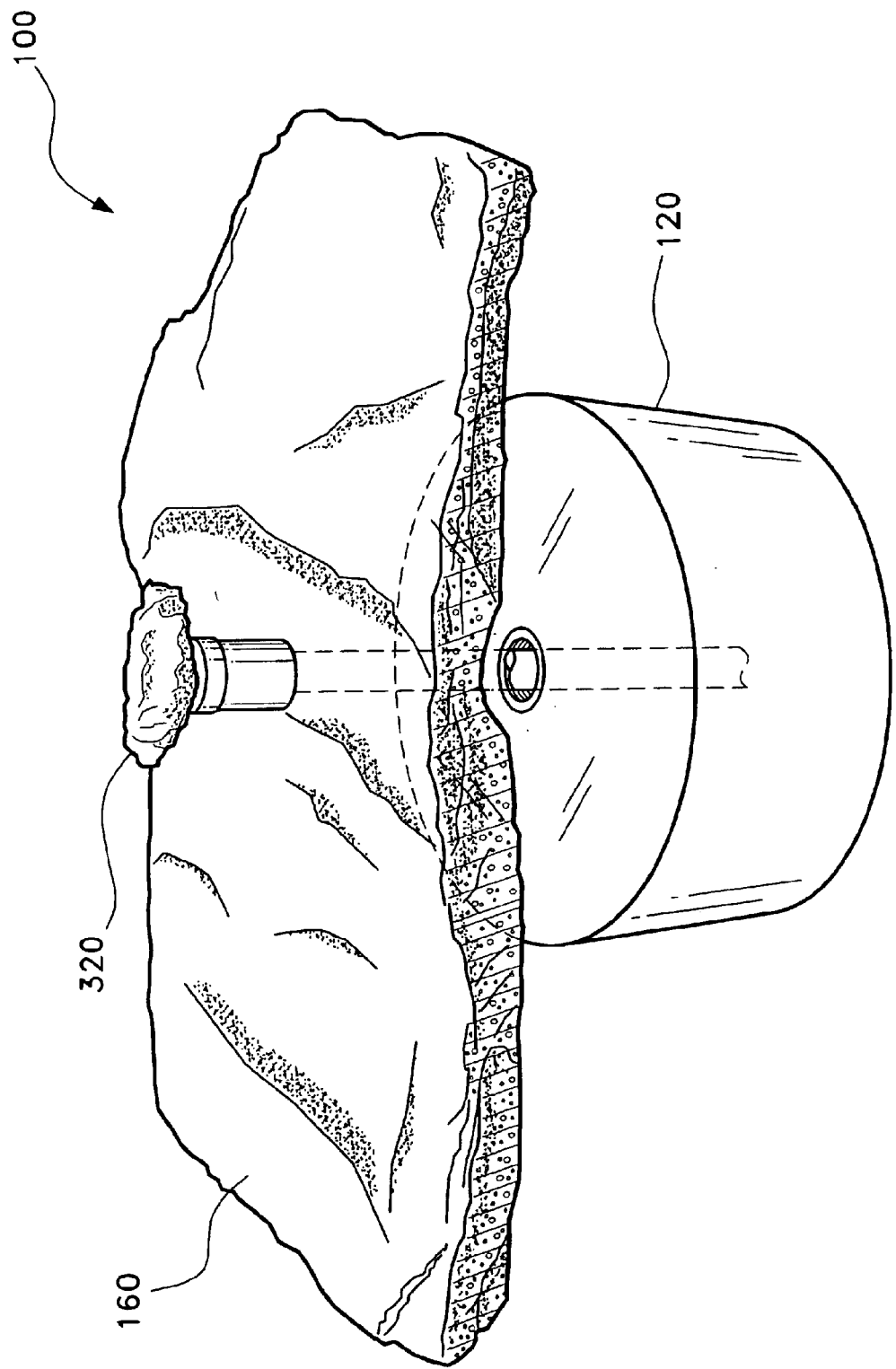

LANDSCAPE PRODUCT THAT BURNS CITRONELLA

BACKGROUND OF THE INVENTION

1. Field of the Invention

The present invention relates to aesthetically pleasing insect repellant systems and more specifically a landscape apparatus comprising a rock and a citronella oil-burning device.

2. Description of the Related Art

Many people like to relax in a pleasing outdoor environment such as a back yard and a landscaped garden. Such enjoyment is particularly sought in the summer when insects abound and can cause a nuisance to, for example, a group of people enjoying a cookout. Thus, there is a need for an apparatus that discourages insect pests.

People generally enjoy outdoor experiences such as spending time in a landscaped garden. It is important that flying insects do not mar the outdoor experience. Anti-insect devices can be used to keep an outdoor location free of annoying insects. However, many anti-insect devices are not attractive to look at and can detract from the ambience of the outdoor experience. Thus, there is a need for an anti-insect device that does not interfere with the natural enjoyment of an attractive outdoor scene.

Some insects, such as mosquitoes, appear at dusk when natural sunlight is limited. Some insect repellant systems are difficult to see in low light conditions. Still other insect repellant systems are overly complex and expensive to manufacture. Thus, there is a need for an attractive insect repellant system that is easy to see in low light conditions and is not overly complex in structure.

Lamps fueled by combustible liquid fuel are known. For example, U.S. Pat. No. 5,938,430, issued Aug. 17, 1999 to A. H. Majerowski, describes a liquid fuel lamp having a wick and a fuel container for containing a combustible liquid fuel that can contain insect repellent such as citronella. Such lamps don't fit well into a landscaped environment where the owner wants the lamp to remain camouflaged or otherwise hidden from view in order to avoid detracting from the landscaped scenery. The '430 devices includes a support pole capable of being thrust into the ground or otherwise engaged to hold a lamp holder in an elevated and generally highly visible position even when the '430 device is not in use.

U.S. Pat. No. 5,765,751, issued Jun. 16, 1998 to A. V. Joshi, describes a device for the controlled release of volatile substances. The '751 device comprise a battery driven volatile substance delivery system employing permeable membrane technology. The '751 device is not easy to see in the dark and is overly complex.

U.S. Pub. No. US 2001/0008318 A1, published Jul. 19, 2001 to J. Mosbaugh, describes a method of making an artificial rock fragrance delivery system. The Mosbaugh system is not designed to be visible in low light conditions.

None of the above inventions and patents, taken either singly or in combination, is seen to describe the instant invention as claimed. Thus a landscape product that burns citronella solving the aforementioned problems is desired.

SUMMARY OF THE INVENTION

The invention is directed to a landscape product that burns a fuel containing citronella to deter insects in a landscaped environment. The landscape product comprises a container defining an aperture, a stone having a through bore and located above the fuel container, a wick holder located above the aperture and extending through the through-bore to a position above at least part of the stone, and a wick extending upwardly from within the fuel container and through the wick holder to a location above the wick holder and thence to a position above at least part of the stone. The landscape product is capable of burning a liquid fuel containing citronella oil to provide a landscape product to deter undesirable insects.

Accordingly, it is a principal object of the invention to provide an attractive looking apparatus that discourages insect pests by burning citronella oil.

It is a further object of the invention to provide an anti-insect device that complements a landscaped environment.

Still another object of the invention is to provide an attractive insect repellant system that is visible in low light conditions.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3A is a perspective view of the landscape product of FIG. 1.

Similar reference characters denote corresponding features consistently throughout the attached drawings.

DETAILED DESCRIPTION OF THE PREFERRED EMBODIMENTS

Figure 1:
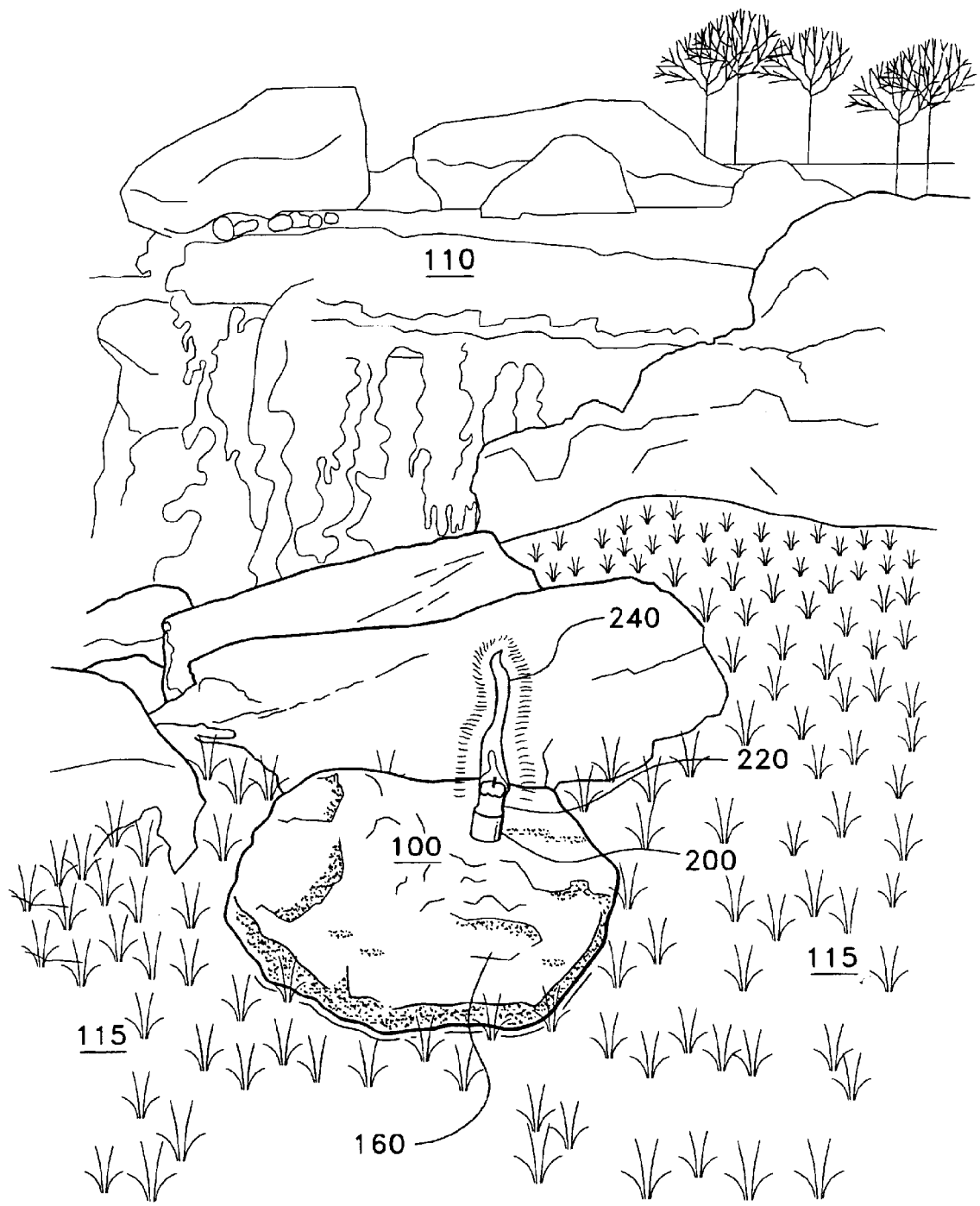
FIG. 1 is an environmental, perspective view of a first embodiment of a landscape product that burns citronella oil according to the present invention.

The present invention is directed to an aesthetically pleasing insect repellant system and more specifically a landscape apparatus comprising a stone and a citronella oil-burning component. The terms "stone" and "rock" are hereinafter regarded as equivalent terms.

With regard to the figures in general, the landscape product of the present invention is denoted generally by the numeral 100. The landscape product 100 comprises a fuel container 120 defining an aperture 140, a stone 160 having a through-bore 180, a wick holder 200 located above the aperture 140 and extending through the through-bore 180 to a position above at least part of the stone 160, and a wick 220 extending upwardly from within the fuel container 120 and through the wick holder 200 to a location above the wick holder 200 and thence to a position above at least part of the stone 160.

FIG. 1 shows an environmental, perspective view of the first embodiment of the landscape product 100 in a landscaped environment 110, according to the invention. The landscape product 100 has an attractive stone 160, a wick holder 200 and a wick 220. The attractive stone 160 appears to be place on the ground 115. The wick 220 is shown in lit form producing a flame 240. The stone 160 serves to hide the fuel container 120 from view. The stone 160 is preferably chosen to fit any one of a range of landscaped environments found, for example, in landscaped gardens. Thus, the stone 160 may take any one of a number of forms to suit a range of landscaped environments including natural landscaped environments, e.g., natural desert gardens around houses built in the desert in Phoenix and Scottsdale, Ariz., USA.

The position of the stone 160 relative to the fuel container 120 is designed to ensure that the landscape product 100 fits perfectly into the landscaped environment 110.

Figure 2:
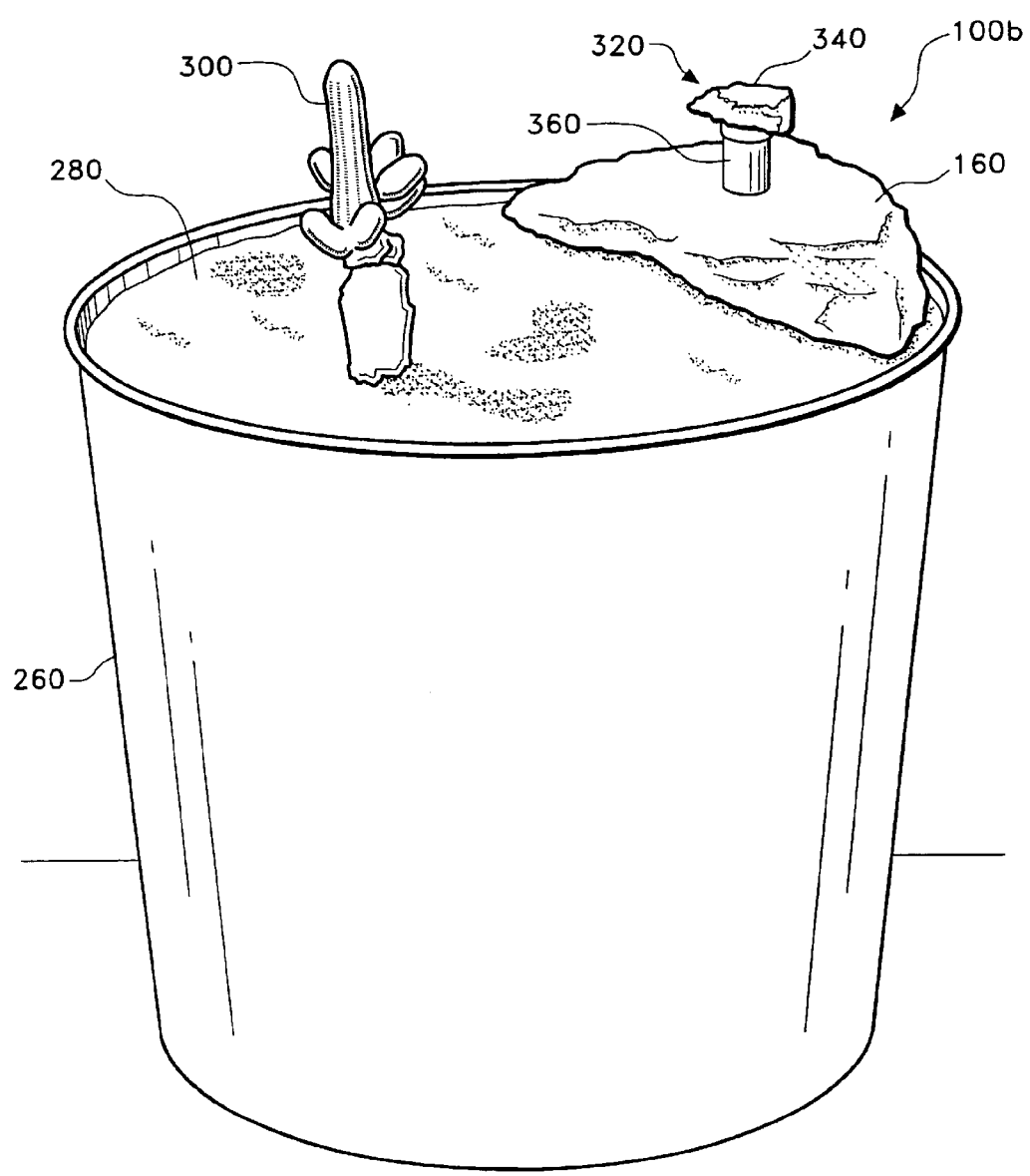
FIG. 2 is an environmental, perspective view of a second embodiment of a landscape product that burns citronella oil according to the present invention.

FIG. 2 shows the second embodiment of the landscape product 100b in combination with a plant pot 260. The fuel container 120 is at least partly buried in a body of filling 280; the filling 280 can comprise of any suitable material such as sand and/or earth. An optional at least one plant 300 is located in the filling 280 as shown; the optional at least one plant 300 can comprise any suitable plant such as, but not limited to, one or more of the following: a suitably sized cactus, a shrub, a Mediterranean perennial bulbous herb such as a jonquil, and/or a bulbous herb whose flowers has a large corona elongated into a trumpet such as a daffodil.

Still referring to FIG. 2, the at least one plant 300 is a cactus and the filling 280 is sand thereby rendering the landscape product 100b particularly suitable for placement in, for example, a desert garden setting as found in housing developments in desert regions around Phoenix, Ariz., USA. It should be understood that the filling 280, the at least one plant 300, and the stone 160 may vary without detracting from the spirit of the present invention.

Still referring to FIG. 2, the landscape product 100b further comprises an optional protective cap 320. The protective cap 320 comprises a stone cap 340 attached to a flame and water resistant tube 360 such as a copper tube or brass tube; the tube 360 may also be made of a heat resistant polymer. The protective cap 320 protects the wick 220 from rain or inadvertent damage when the landscape product 100b is stored or otherwise not in use. The protective cap 320 also functions as a flame snuffer to enable a human owner or operator to safely snuff out the flame 240. The stone cap 340 ensures that the landscape product 100b remains a visibly attractive item when not in use.

FIG. 3A shows a perspective view of the landscape product 100 according to the invention; the landscape product 100 is shown in combination with the optional protective cap 320 comprising the water resistant tube 340 and the stone cap 360. The spatial relationship between the stone 160 and fuel container 120 is evident in the figure, wherein the stone 160 is sited above the fuel container 120. In use the fuel container 120 is at least partly buried in the environment 110 or filling 280 with the stone 160 hiding the top of the fuel container 120. The fuel container 120 may also be hidden from view by, for example, a layer of mulch 400 (see FIG. 4).

Figure 3B:
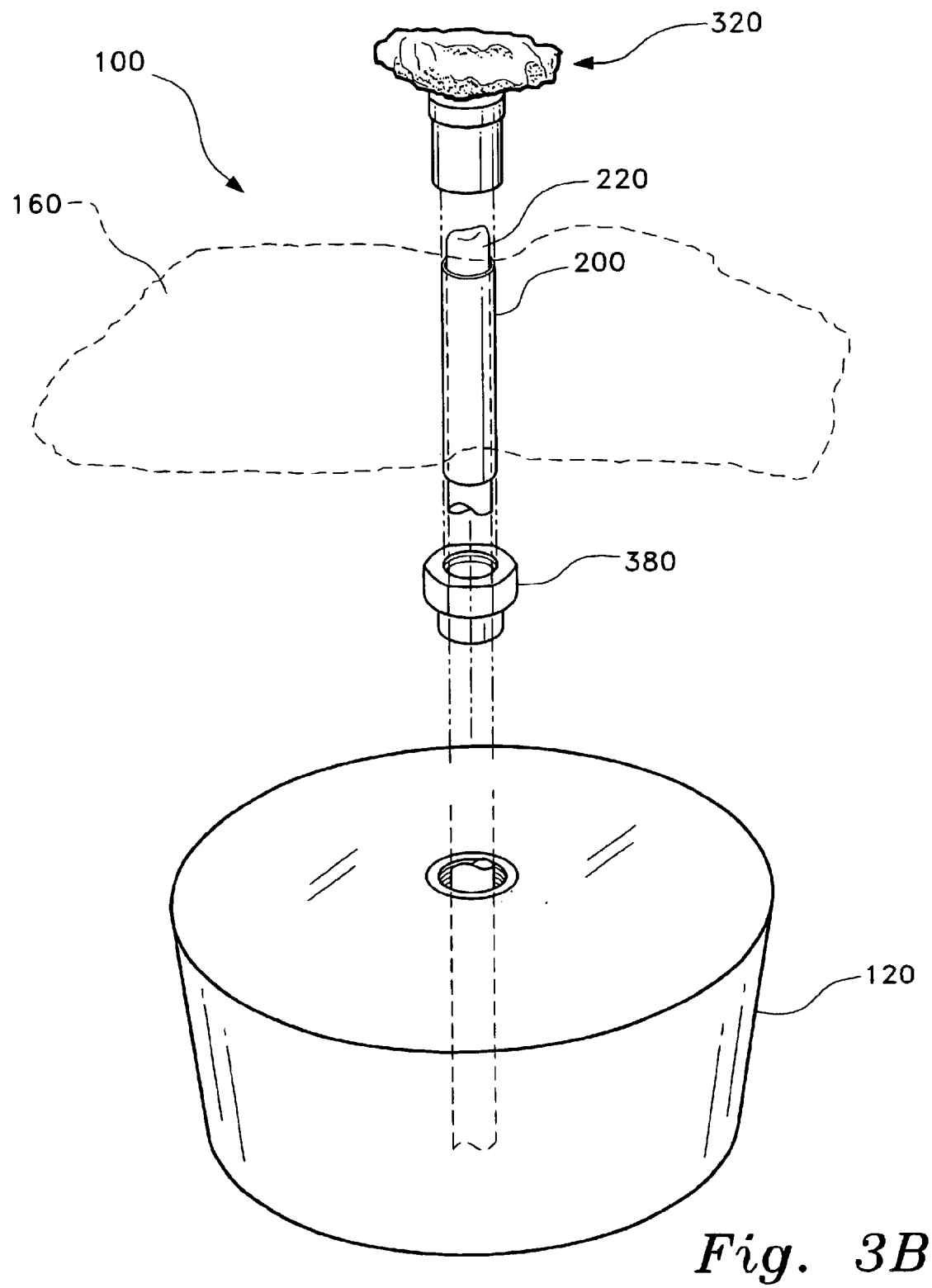
FIG. 3B is an exploded view of the landscape product of FIG. 3A.

FIG. 3B shows an exploded view of the landscape product 100 of FIG. 3A. A union fitting 380 holds the wick holder 200 above the container 120. The wick 220 travels through union fitting 380 and into the container 120. The union fitting 380 may be made of any suitable heat resistant material such as brass, copper or heat resistant plastic. However, the union fitting 380 is preferably made out of a material such as a polyester thermoset plastic that is a poor conductor of heat to prevent excess heat traveling from the flame 240 via the wick holder 200 into the fuel in the container 120. The wick holder 200 may be made of any suitable heat resistant material such as copper, e.g., a copper tube with open opposite ends.

Figure 4:
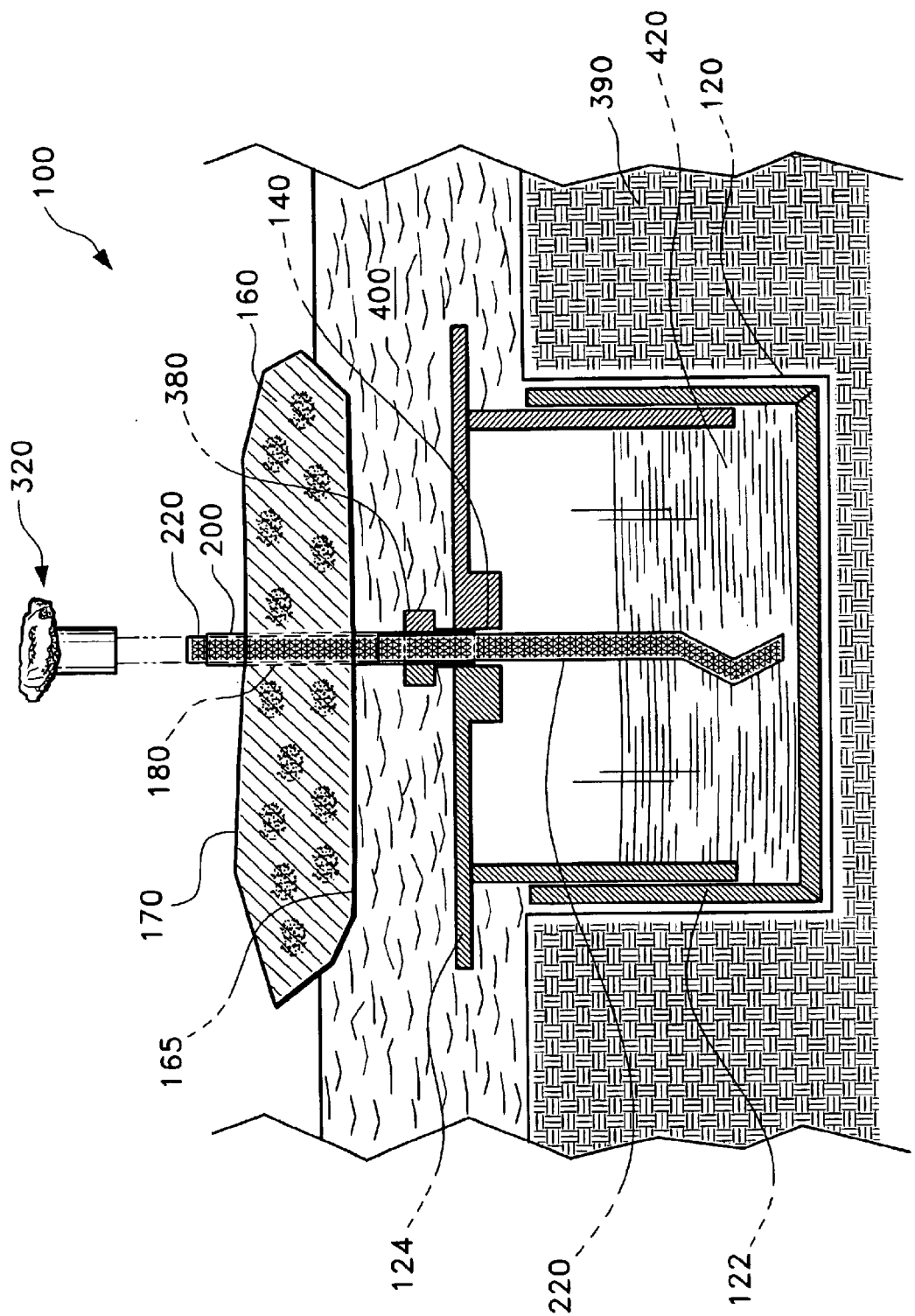
FIG. 4 is a schematic section view of a landscape product that burns citronella oil according to the present invention.

FIG. 4 is a schematic view of the landscape product 100. The fuel container 120 is shown buried in the ground. More specifically, the lower part 122 of the fuel container 120 is buried in earth 390 and upper part 124 is covered in a mulch layer 400. The stone member 160 has a lower surface 165 and a top surface 170. The lower surface 165 is in contact with the mulch layer 400. The top surface 170 is shown positioned above the mulch layer 400. The stone member 160 is preferably a natural stone such as a river rock. Alternatively, the stone member 160 may be artificial and, for example, painted to look like a natural stone. The stone member 160 can vary in size but should be larger than the stone cap 340, and sufficiently large to accommodate the through bore 180 defined therein.

Still referring to FIG. 4, the fuel container 120 has a quantity of fuel 420, wherein the fuel comprises citronella oil. Citronella oil is known to have anti-insect properties. The fuel containing citronella oil 420 is driven up the wick 220 by capillary action when the wick 220 is alight and producing a flame 240.

It is to be understood that the present invention is not limited to the embodiment described above, but encompasses any and all embodiments within the scope of the following claims.

We claim:

1. A landscape product capable of burning a combustible material containing citronella, comprising:
    a container for storing fuel containing citronella in the ground, wherein the container has an aperture;
    a stone located above the fuel container, the stone having a through-bore;
    a wick holder located above the aperture and extending through the through-bore to a position above at least part of the stone; and
    a wick extending upwardly from within the fuel container and through the wick holder to a location above the wick holder and thence to a position above at least part of the stone,
    whereby the landscape product is capable of burning a liquid fuel containing citronella oil and thereby provide a landscape product to deter undesirable insects.

2. The landscape product of claim 1, wherein the landscape product further comprises a protective cap, wherein the protective cap is adapted to attach and cover the wick and thereby protect the wick from wet weather.

3. The landscape product of claim 1, wherein the landscape product further comprises a protective cap, wherein the protective cap is adapted to attach and cover the wick and thereby protect the wick from wet weather, and wherein the protective cap is capable of snuffing out a flame.

4. The landscape product of claim 1, wherein the landscape product further comprises a protective cap, wherein the protective cap is adapted to attach and cover the wick and thereby protect the wick from wet weather, and wherein the protective cap comprises a flame and water resistant cylinder and a stone cap.

5. The landscape product of claim 1, wherein the stone is a natural stone.

6. The landscape product of claim 1, wherein the stone is an artificial stone.

7. The landscape product of claim 1, wherein the stone is made of artificial material painted to mimic a natural stone.

8. The landscape product of claim 1, wherein the container contains combustible fuel citronella oil.

* * * * *